W. WEBSTER.
EXCAVATING AND HOISTING DEVICE.
APPLICATION FILED MAR. 23, 1908.

925,734.

Patented June 22, 1909.
7 SHEETS—SHEET 1.

Witnesses:
L. L. Simpson
A. H. Opsahl

Inventor:
William Webster
By his Attorneys:
Williamson & Merchant

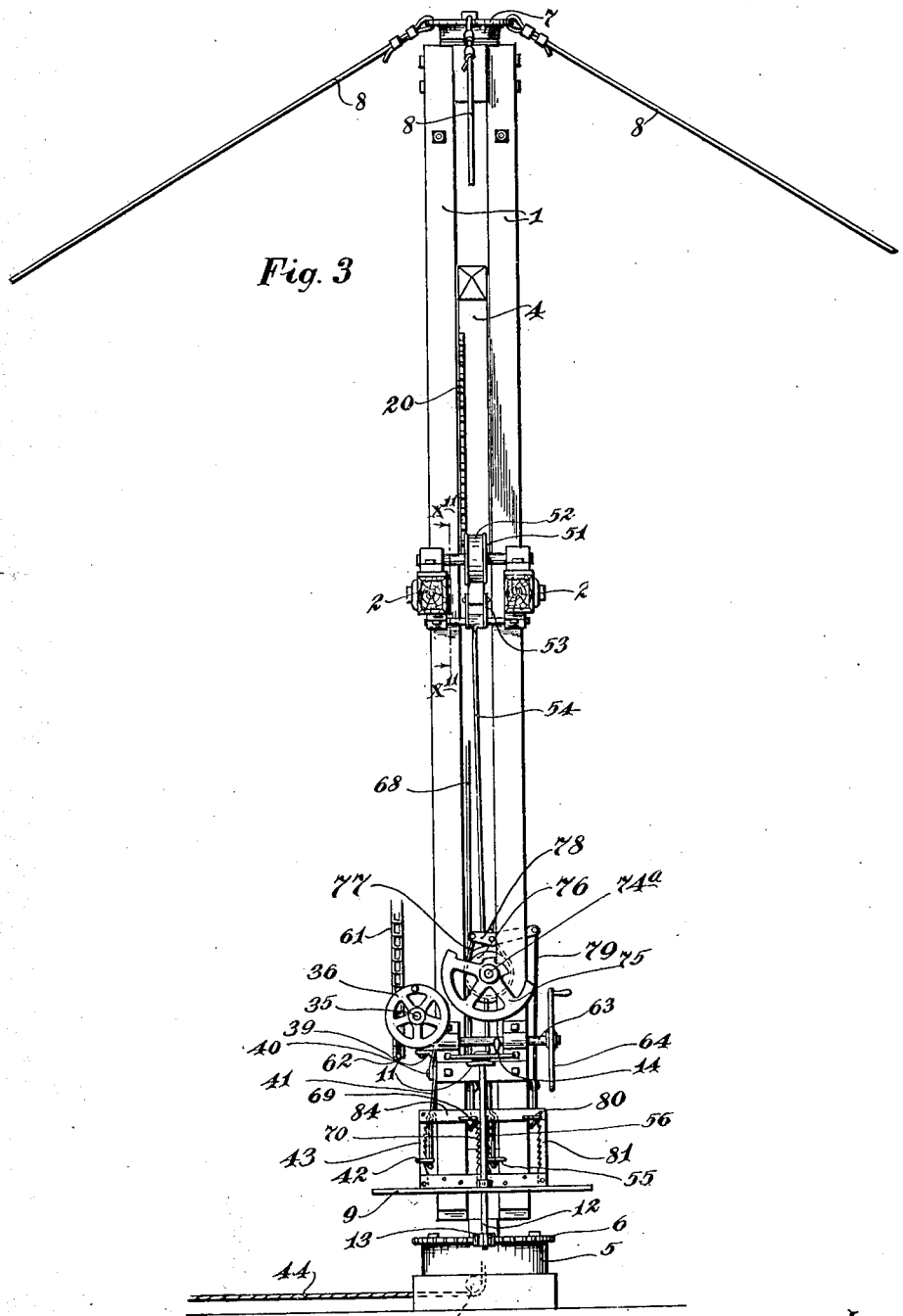

W. WEBSTER.
EXCAVATING AND HOISTING DEVICE.
APPLICATION FILED MAR. 23, 1908.
925,734.
Patented June 22, 1909.
7 SHEETS—SHEET 3.
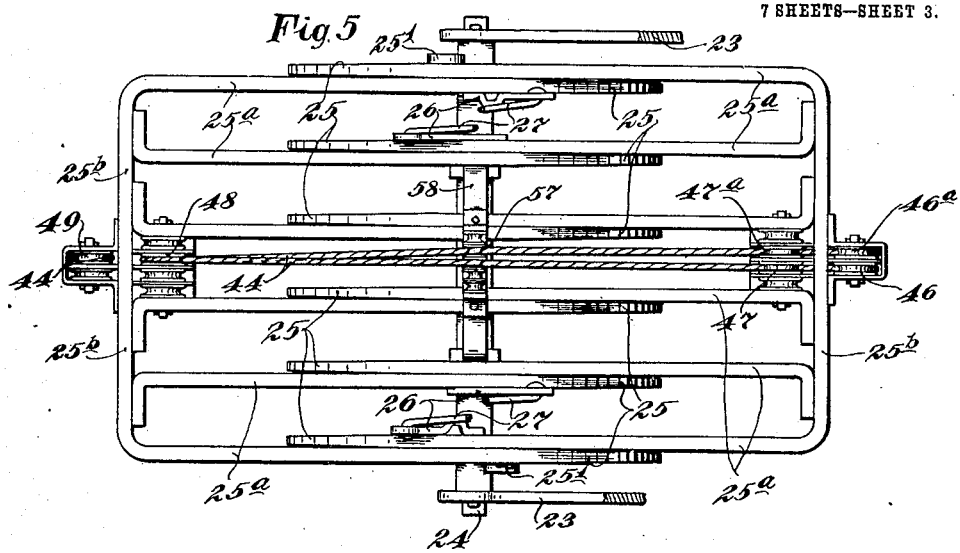
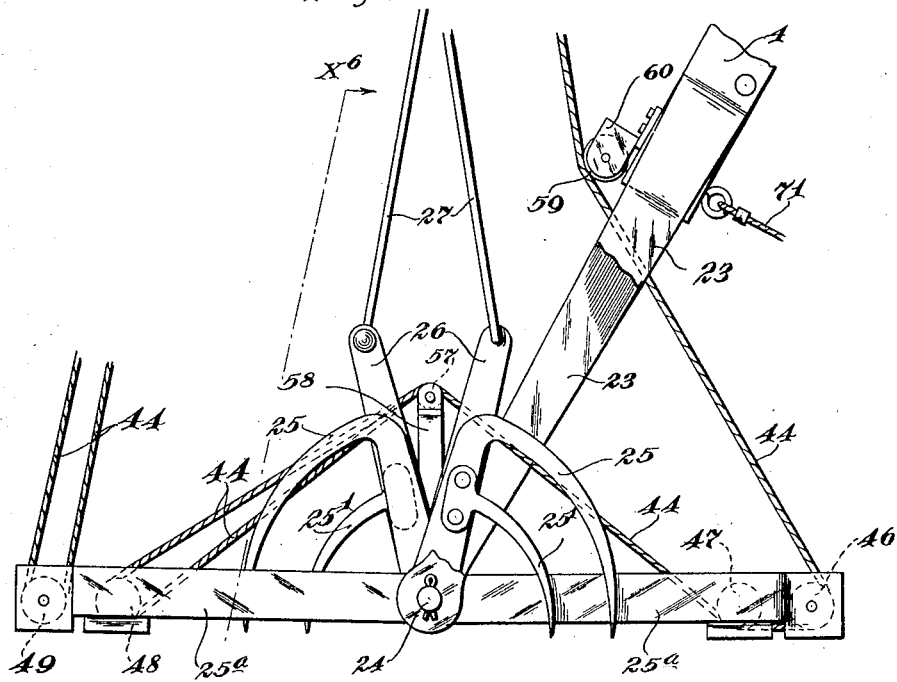
Witnesses:
L. L. Simpson
A. H. Opsahl
Inventor:
William Webster
By his Attorneys
Williamson Merchant

W. WEBSTER.
EXCAVATING AND HOISTING DEVICE.
APPLICATION FILED MAR. 23, 1908.

925,734.

Patented June 22, 1909.
7 SHEETS—SHEET 4.

Witnesses:
L. L. Simpson
A. H. Opsahl

Inventor:
William Webster
By his Attorneys:
Williamson Merchant

W. WEBSTER.
EXCAVATING AND HOISTING DEVICE.
APPLICATION FILED MAR. 23, 1908.
925,734.
Patented June 22, 1909.
7 SHEETS—SHEET 5.
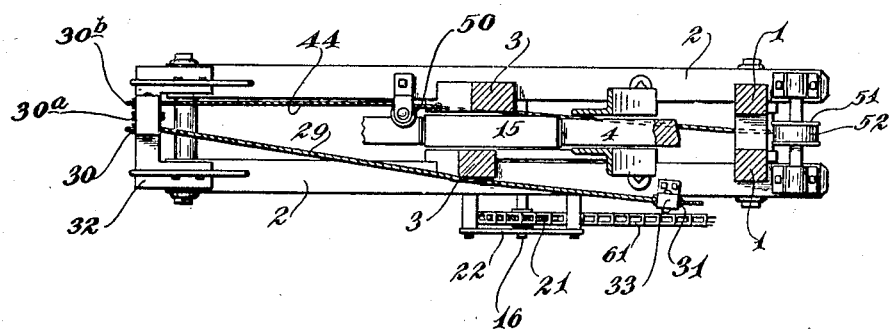
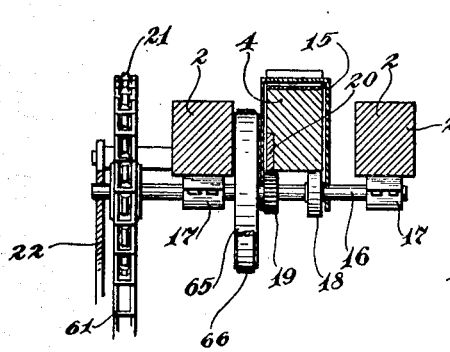
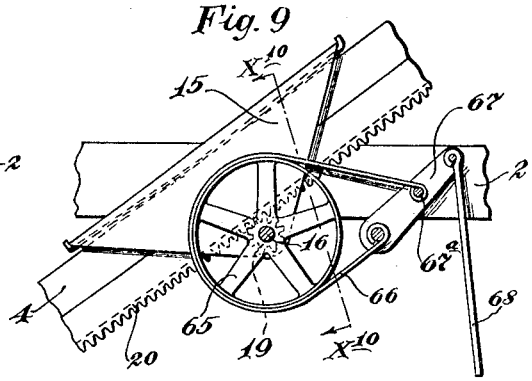
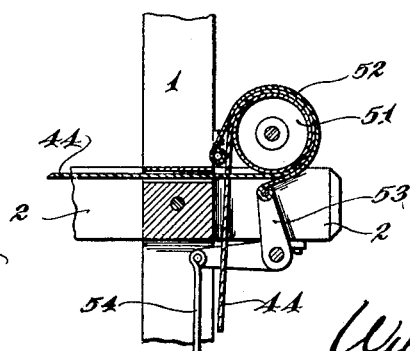
Witnesses:
L. L. Simpson
A. H. Opsahl
Inventor:
William Webster
By his Attorneys:

W. WEBSTER.
EXCAVATING AND HOISTING DEVICE.
APPLICATION FILED MAR. 23, 1908.
925,734.
Patented June 22, 1909.
7 SHEETS—SHEET 6.
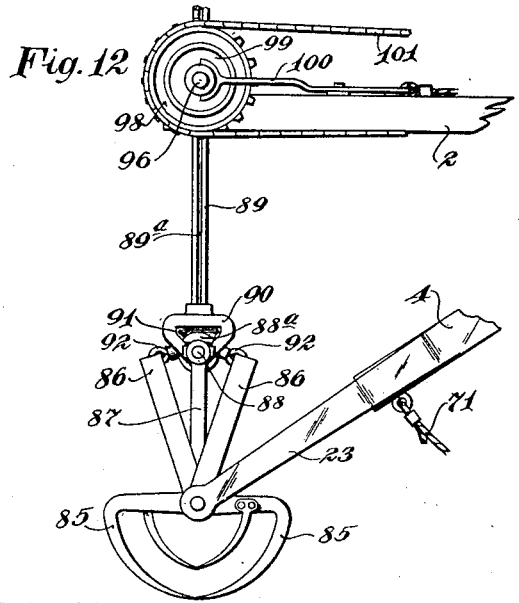
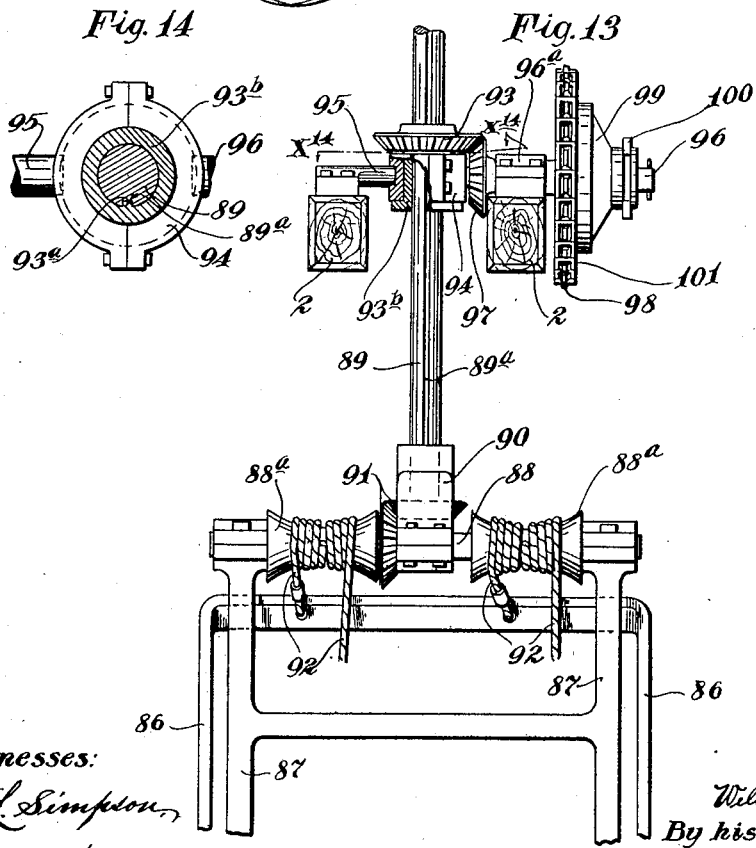
Witnesses:
L. L. Simpson
A. M. Opsahl
Inventor:
William Webster
By his Attorneys:
William Merchant W. WEBSTER.
EXCAVATING AND HOISTING DEVICE.
APPLICATION FILED MAR. 23, 1908.
925,734.
Patented June 22, 1909.
7 SHEETS—SHEET 7.
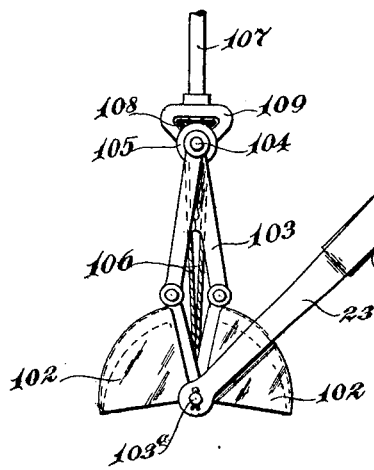
Fig. 16
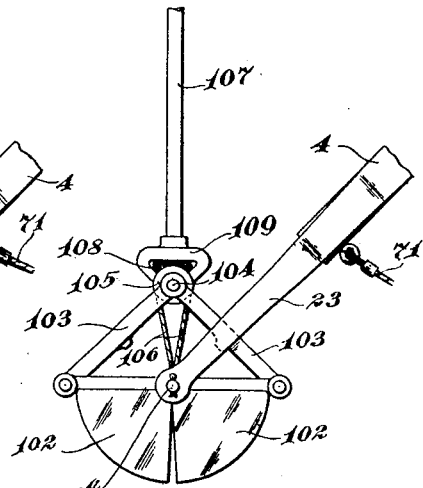
Fig. 17
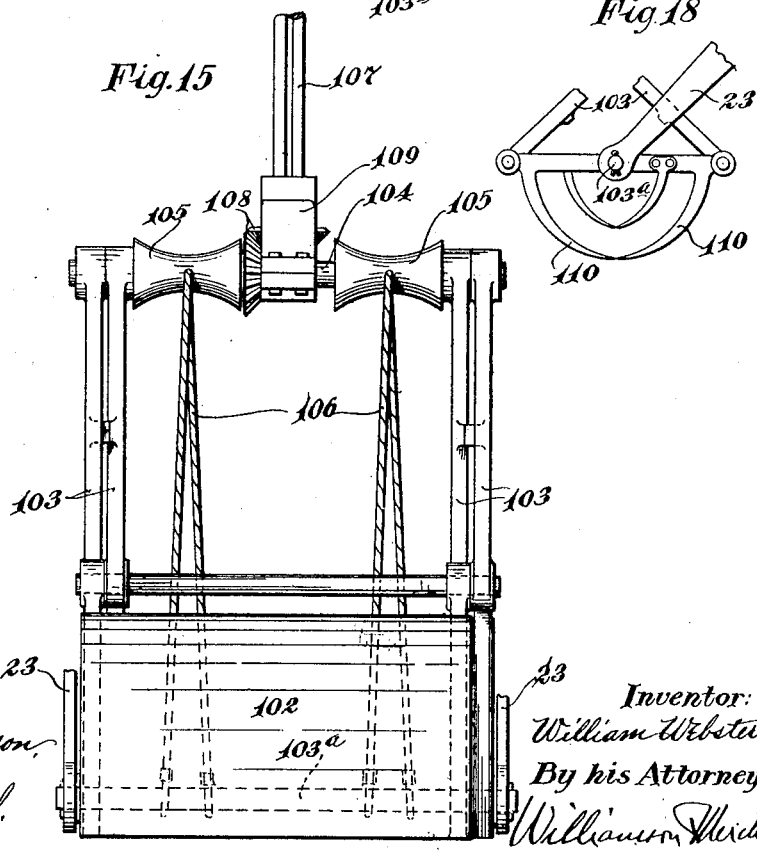
Fig. 15
Fig. 18
Witnesses:
L. L. Simpson
A. H. Opsahl
Inventor:
William Webster
By his Attorneys
Williamson Merchant

UNITED STATES PATENT OFFICE.

WILLIAM WEBSTER, OF MINNEAPOLIS, MINNESOTA.

EXCAVATING AND HOISTING DEVICE.

No. 925,734.           Specification of Letters Patent.        Patented June 22, 1909.

Application filed March 23, 1908. Serial No. 422,624.

*To all whom it may concern:*

Be it known that I, WILLIAM WEBSTER, a citizen of the United States, residing at Minneapolis, in the county of Hennepin and State of Minnesota, have invented certain new and useful Improvements in Excavating and Hoisting Devices; and I do hereby declare the following to be a full, clear, and exact description of the invention, such as will enable others skilled in the art to which it appertains to make and use the same.

My invention has for its object to provide an improved hoisting and excavating device adapted for general use, and to this end it consists of the novel devices and combinations of devices hereinafter described and defined in the claims.

In the accompanying drawings which illustrate the invention, like characters indicate like parts throughout the several views.

Figure 1:
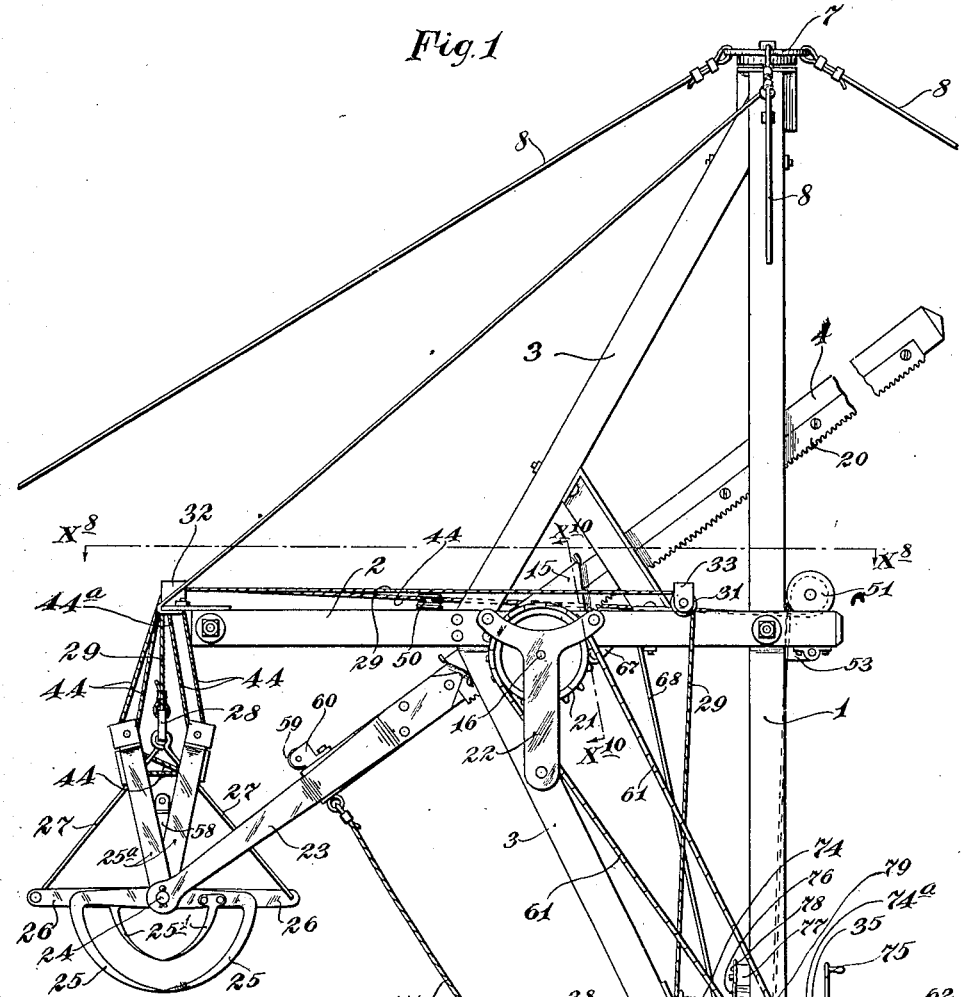
Figure 2:
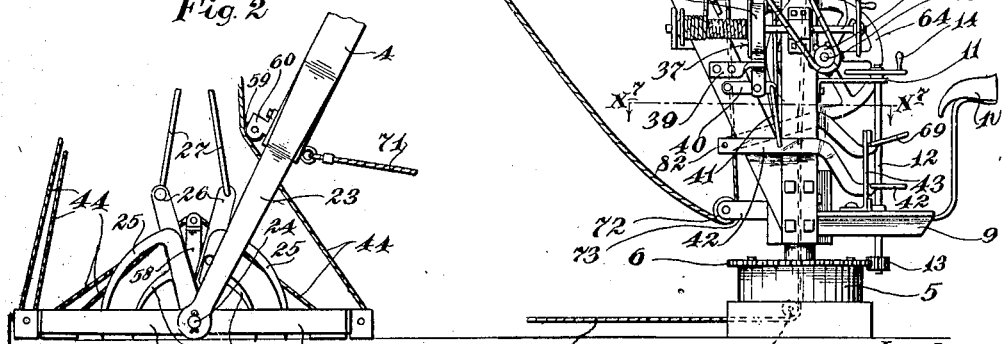
Figure 6:
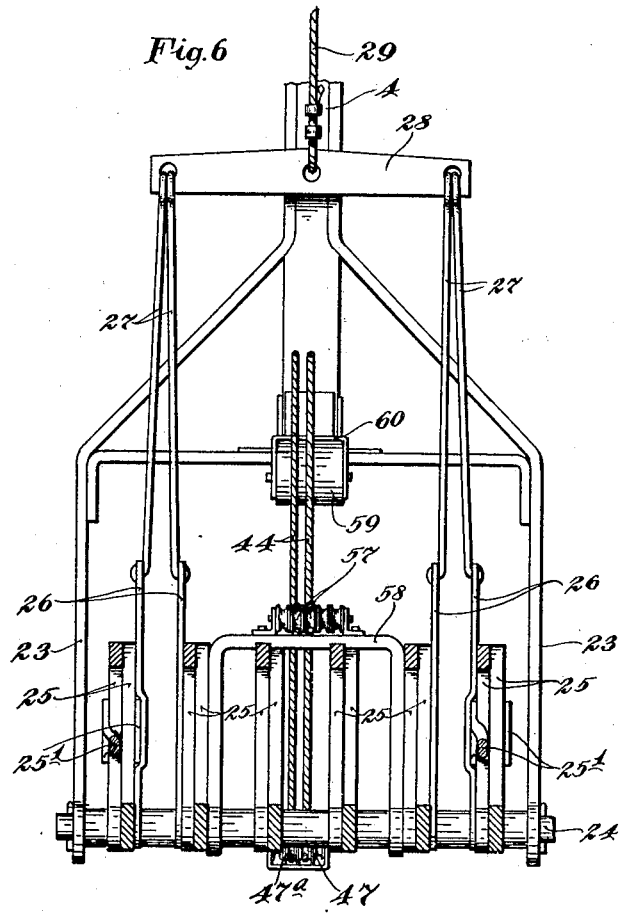
Figure 7:
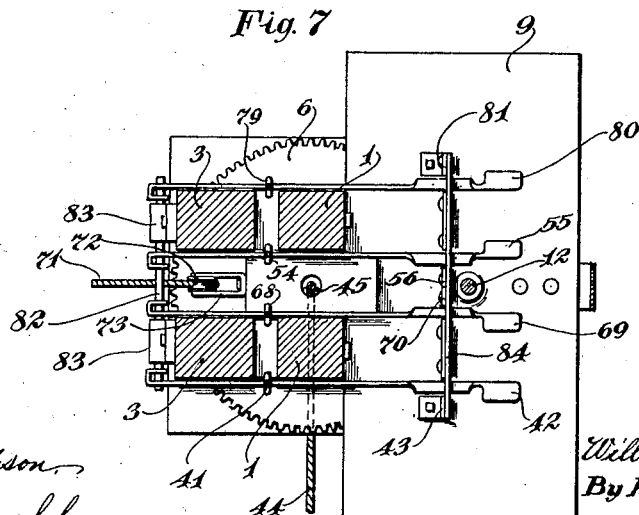

Referring to the drawings, Figure 1 is a view in side elevation, showing the improved hoisting and excavating device, so-called, with the boom and fork, or excavating device proper, in elevated positions. Fig. 2 is a detail in side elevation, showing the boom lowered so as to hold the excavating device or fork against the ground, some parts being broken away. Fig. 3 is a rear elevation of the hoisting and excavating device, some parts being broken away and some parts being removed. Fig. 4 is a view corresponding to Fig. 2, but with some parts broken away, more clearly showing the fork construction, and the parts being on a larger scale than in said Fig. 2. Fig. 5 is a plan view of the parts shown in Fig. 4. Fig. 6 is a transverse vertical section taken on the line $x^6$ $x^6$ of Fig. 4. Fig. 7 is a horizontal section taken on the line $x^7$ $x^7$ of Fig. 1. Fig. 8 is a horizontal section taken on the line $x^8$ $x^8$ of Fig. 1. Fig. 9 is a detail in side elevation, showing the connection between the derrick and boom of the hoisting device, some parts being broken away. Fig. 10 is a transverse section taken approximately on the line $x^{10}$ $x^{10}$ of Figs. 1 and 9. Fig. 11 is a section taken on the line $x^{11}$ $x^{11}$ of Fig. 3. Fig. 12 is a detail in side elevation, with parts broken away, illustrating a modified construction of the grapple acting forks and means for actuating the same. Fig. 13 is an enlarged view in front elevation, of the parts shown in Fig. 12, some parts being broken away. Fig. 14 is a detail in horizontal section, taken on the line $x^{14}$ $x^{14}$ of Fig. 13. Fig. 15 is a view corresponding to Fig. 13, but illustrating a still further modified construction. Figs. 16 and 17 are views in side elevation, illustrating the same construction shown in Fig. 15; and Fig. 18 is a view corresponding to Fig. 17, but showing the grapple-acting excavating device in the form of a fork instead of a scoop.

The derrick, which forms a part of the improved machine, is made up of laterally spaced vertical columns 1, laterally spaced horizontally extended beams 2, and laterally spaced truss beams 3, which parts are tied together only at the upper and lower ends of the columns 1 and at the ends of said horizontal beams 2, so that between the two halves of the derrick there is left an open space in which freely works a heavy boom 4. At its lower end the derrick is journaled, preferably by a step bearing, in a suitable base support or table 5, to the top of which is secured an annular gear 6. The upper end of the derrick is journaled in a bearing cap 7 that is held in the usual way by guide rods or lines 8. Rigidly secured to and projecting rearward from the lower portion of the derrick is an operator's platform 9 to which as shown, a seat 10 is secured. Suitably journaled in the platform 9 and in a bearing 11 on the boom is an upright shaft 12 provided at its depending end with a pinion 13 that meshes with a fixed gear 6. To the upper end of said shaft 12 is secured a crank wheel 14, by means of which the said shaft may be rotated in either direction, to thereby cause the derrick to swing on its vertical pivots.

The boom 4 is connected to the derrick beams 2 with freedom for both endwise and pivotal movements; and, in forming this connection, the intermediate portion of said boom is extended through a guide sheath 15, the downturned edges of which, below the boom, are pivoted on a transverse shaft 16 which, in turn, is journaled in bearings 17 fixed to the derrick beams 2. The shaft 16, therefore, constitutes a pivotal support for the boom 4. The boom is supported directly by a wheel 18 and a gear 19, both of which are secured to the shaft 16. The wheel 18 directly engages the under surface of the boom, while the gear 19 engages a rack-bar 20 that is rigidly secured to the lower edge of one side of the boom and extends longitudinally of the boom.

At its outwardly projecting end, the shaft 16 carries a sprocket wheel 21, and outward of said sprocket, said shaft is shown as further supported by a bearing plate 22 secured to the adjacent side of the derrick.

At its free or working end, the boom 4 is provided with laterally spaced projecting bearing arms 23 that support a hinge rod 24 at their ends.

Figs. 1 to 6 inclusive show a grapple acting excavating device in the nature of a fork, or rather, a pair of reversely-acting forks. Each of these forks is made up of a multiplicity of curved tines 25 that are intermediately pivoted on the hinge rod 24 and have arms $25^a$ that are rigidly connected to a transverse tie bar $25^b$. The arms $25^a$ are located on opposite sides of the hinge rod 24 in respect to the tines 25 to which they are rigidly connected, and the outermost tines 25 are provided with arms 26 that are connected, by rods 27, to an equalizing bar 28. The intermediate portion of the equalizing bar 28 is connected to one end of a cable 29, which cable runs over guide sheaves 30 and 31 (see Figs. 1 and 8). The guide sheave 30 is mounted in a bracket 32 which connects and assists in tying together the outer ends of the derrick beams 2, while the sheave 31 is journaled in a bracket 33 secured to one of said beams 2 near its inner end. The other end of the cable 29 is attached to and adapted to be wound upon a windlass drum (see Fig. 1) which is mounted in suitable bearings on the lower portion of the derrick and is provided, at one end of its shaft 35, with a crank wheel 36 by means of which said windlass drum may be operated.

At its intermediate portion the drum shaft 35 is provided with a frictional brake wheel 37 with which coöperates a metallic brake strap 38, one end of which is attached to a bracket 39 rigid on one of the truss beams 3, and the other end of which is connected to the intermediate portion of a short lever 40 which, in turn, is pivoted at one end, to the said truss beam 3. The free end of the lever 40 is connected, by a short link 41, to the intermediate portion of a foot-actuated lock lever 42. The lock lever 42, at one end, is pivotally connected to a bearing in the lower portion of the derrick, and the other end thereof, by a lateral movement, is adapted to be engaged with and disengaged from a ratchet-toothed latch bar 43 (see Figs. 1 and 3) that is rigidly secured to the platform 9.

A grapple-actuating cable 44 is secured, at one end, $44^a$ (see Fig. 1) to the bracket 32 which is at the ends of the derrick beams 2; and, at its other end, this cable is extended through an axial passage in the lower end of the derrick and is run under a guide sheave 45 mounted within the base support or table 5. From the bracket 32 this cable 44 runs under guide sheaves 46 and 47 (see Figs. 1, 4 and 5), thence around a guide sheave 48, thence under guide sheaves $47^a$ and $46^a$, thence over the guide sheave $30^a$, thence under and over a guide sheave 49 and thence back and over a guide sheave $30^b$. The guide sheaves 46, 47, $46^a$ and $47^a$ are mounted on the upper portion of one of the grapple forks, while the sheaves 48 and 49 are mounted on the upper portion of the other grapple fork, all as best shown in Figs. 4 and 5. In Fig. 5 the sheaves 47, $47^a$, 48 and 49 are shown in duplicate, certain thereof not being used in the arrangement of the cable 44 illustrated in the drawings, but making possible, when desired, a more powerful but slower acting block and tackle arrangement. The guide sheaves $30^a$ and $30^b$, as well as the before described sheave 30, are journaled in the bearing bracket 32 which is applied to the outer ends of the horizontal derrick beams 2.

From the guide sheave $30^b$ the cable 44 runs against a guide sheave 50 mounted on one of the beams 2 (see Fig. 8) and from thence runs completely around a combined guide and brake wheel 51 (see Figs. 8 and 11). From the said wheel 51 the cable 44 runs to the sheave 45, as already described. The lower end of the cable 44 may be moved either by a horse or an engine, as may be desired.

The cable 44 is adapted to be clamped against the wheel 51 and, hence, locked against movement, by a metal brake strap 52 (see Fig. 11) which, at one end, is anchored to the derrick and at its other end is pivoted to one end of a bell crank 53 which, in turn, is intermediately pivoted to the projecting rear ends of the derrick beams 2. The other arm of said bell crank is connected, by a rod 54, to a lock lever 55 which, at one end, is pivoted to the derrick and, at its other end, is adapted to be engaged by the foot of the operator and to be moved into and out of interlocking engagement with a ratchet-toothed bar 56 (see Figs. 3 and 7) rigidly secured to the platform 9.

The cable 44 may be connected in various different ways with the two grapple forms above described, but as illustrated in Figs. 1 and 6 inclusive, the intermediate portion thereof is arranged to run over idle guide sheaves 57 mounted on the upper end portion of a ball-like lever 58 loosely pivoted on the hinge rod 24 and working loosely between the two rows of fork tines 25 (see Fig. 4). The purpose of this lever or bail 58 will hereinafter appear. Also in the position of the parts shown in Fig. 4, the cable 44 runs against a guide roller 59 journaled in a bearing 60 on the free end of the boom 4.

The outside members only of the tines 25 are provided with secondary prongs or teeth $25^1$ (see Figs. 1, 2 and 4) which assist in holding the material taken up by the grapple-acting fork.

For imparting endwise movement to the boom 4 a sprocket chain 61 is run over the sprockets 21 and over a small sprocket 62 which is carried by a shaft 63 (see Figs. 1 and 3) mounted in suitable bearings on the rear lower portions of the boom columns 1 and provided, at one end, with a crank wheel 64, by means of which said shaft may be rotated to thereby cause rotation of the pinion 19 of the shaft 16 and, hence, endwise movements of the boom.

To lock the shaft 16 against rotation and, hence, the boom 4 against endwise movements, said shaft is provided with a brake wheel 65 with which coöperates a metallic brake strap 66, best shown in Figs. 9 and 10. One end of the brake strap 66 is pivotally attached to one end of a lever 67 that is intermediately pivoted to and is located between the derrick beams 2. The other end of said strap 66 is pivotally attached to the intermediate pivot 67$^a$ of said lever 67. The free end of said lever 67 is connected to the upper end of a rod 68, the lower end of which is connected to the intermediate portion of a foot lever 69, the rear end of which lever is pivotally connected to the lower portion of the derrick, and the free end of which is adapted to be engaged with and disengaged from a ratchet-toothed bar 70 rigidly secured to the platform 9.

To the free end of the boom 4 is attached a cable 71 that runs under a guide sheave 72 mounted in a bearing 73 on the lower portion of the derrick (see Figs. 1 and 3). The other end of this cable is secured to and adapted to be wound upon a windlass drum 74, the shaft 74$^a$ of which is journaled in suitable bearings on the derrick and is provided, at its projecting end, with a crank wheel 75, by means of which said drum may be rotated to wind up or let out said cable 71. To lock said drum 74 against rotation and thereby hold the cable 71 drawn taut, the shaft 74$^a$ thereof is provided with a brake wheel 76 with which coöperates a metallic brake strap 77, the ends of which are pivotally connected to a lever 78 that is intermediately pivoted to a suitable bearing on the derrick. The free end of this lever 78 is connected, by a rod 79, to the intermediate portion of a foot lever 80. This lever 80 is pivotally connected to the lower portion of the derrick and its free end is adapted to be engaged and disengaged from a ratchet-toothed lock bar 81 rigidly secured to the platform 9.

The four foot levers 42, 55, 69 and 80, as shown, are all substantially alike and are pivoted on a rod 82 held by bearings 83 rigidly secured to the lower portion of the derrick, as best shown in Fig. 7. As shown in Figs. 1, 3 and 7, the upper ends of the ratchet-toothed bars 43, 56, 70 and 81 are rigidly tied together by a cross bar 84.

The manner in which the boom 4 may be moved endwise has already been clearly described. The grapple acting fork is adapted to be raised and lowered by movements of the cable 44. The operation of the device, more fully described, is as follows: While the grapple fork is raised from the ground substantially as shown in Fig. 1, the cable 29 should be drawn taut and temporarily secured by means of the brake 37—38. Then, by releasing the cable 44, the grapple fork is permitted to lower as far as permitted by the cable 29; and, under such downward movement of the fork, the cable 29 and its link connection 27 will cause the fork to move into an open position, as indicated in Fig. 4. Then, after the said brake 37—38 has been released, the fork will be permitted to lower onto the ground in its open position, as shown in Fig. 2. Then the boom 4 should be locked against endwise movements by the setting of the brake 65—66, and next the said boom should be locked against upward swinging movement by drawing the cable 71 taut and securing the latter by means of the brake 76—77. This positively locks the lowered free end of the boom against movement in all directions. Then the cable 44 should be drawn outward so as to move upward the arms 25$^a$ and thereby force the tines 25 downward into the ground or other material which is to be taken up by the grapple fork. It is, of course, necessary in order to insure downward movements of the tines into the ground that the lower end of the boom be locked as above described, for otherwise the grapple would be lifted bodily from the ground. When, by outward or drawing movement of the cable 44, the tines of the grapple fork have been forced into the ground, the foot lever 80 should be released and moved upward so as to release the brake 76—77 which has served to lock or hold the cable 71. This release of the cable 71 permits further outward or drawing movement of the cable 44 to raise the closed grapple fork and its load to the proper elevation.

While the cable 44 is locked or held so as to hold the loaded fork in elevated position, the cable 29 is again drawn taut and locked in the manner before described. Then, to cause the grapple fork to drop its load, slack is given to the cable 44, and this being done, the weight of the grapple fork and its load will be transmitted to the cable 29 through the arms 26, links 27 and bar 28, and the said weight will then cause the grapple fork to move downward slightly and open up, as shown in Fig. 4. Instead of a grapple fork, a grapple acting scoop may be used in connection with the machine above described. Also, instead of the means above described for controlling the movements of the grapple fork or scoop, herein designated broadly as a grapple-acting excavating device, various other connections may be employed.

By reference to Fig. 4 it will be seen that when the grapple fork is in its open position the transversely extended portion of the cable 44 is held above the pivot rod 24, so that it is given leverage to close the grapple fork when the lower end of the cable 44 is drawn outward. Grapple forks 85 which have transversely crossed arms 86 are pivoted to the boom arms 23 and to a centrally located frame 87. A windlass shaft 88 having two drums 88$^a$ is journaled in the upper end of the bracket 87. An upwardly extended shaft 89 is journaled at its lower end in a gear case 90 which, in turn, is journaled on the central portion of the shaft 88. The shaft 88 is connected to the shaft 89 by a pair of miter gears 91. Transverse connecting bars of the grapple arms 86 are connected to the opposite ends of cables 92, the intermediate portions of which are secured to and adapted to be wound upon the windlass drums 88$^a$. The shaft 88 has a longitudinally extended groove 89$^a$ that engages with a key 93$^a$ formed in the sleeve-like hub 93$^b$ of a bevel gear 93, through which said shaft is extended and is adapted to slide vertically. The gear hub 93$^b$ is journaled in a bearing 94 which, in turn, is pivoted on the opposing ends of a trunnion 95 and shaft 96, the former of which is rigidly secured to one of the derrick beams 2; and the other of which is journaled in a bearing 96$^a$ on the other derrick beam. The shaft 96 carries a bevel pinion 97 that meshes with the gear 93. On the projecting end of the shaft 96 is a loose sprocket 98 that is adapted to be coupled to said shaft, at will, by a suitable clutch 99 which, in turn, is adapted to be manipulated by a shipper lever 100. A sprocket chain 101, which may be driven by any suitable means, runs over the sprocket
98. With this construction, under movements of the boom 4, the grapple fork is capable of vertical and oscillatory movements and when the cables 92 are wound upon the drums 88$^a$ the grapple fork will be closed up, as shown in Fig. 12.

In the construction illustrated in Figs. 16, 17 and 18, grapple acting scoops 102 are secured to the lower members of laterally spaced reversely acting pairs of toggle links 103, the lower joints of which toggles are pivoted to the boom prongs 23 by a shaft 103$^a$. In this construction, a shaft 104 provided with windlass drums 105 constitutes a pivotal connection for the upper joint of the toggles. These drums 105 are connected to the intermediate portions of cables 106, the ends of which are connected to the shaft 103$^a$ so that when the cables are wound upon said drums the toggles 103 will be buckled and the scoops will be closed, as shown in Fig. 17. A driving shaft 107 corresponding to the driving shaft 89 is connected to the windlass shaft 104 by miter gears 108 and is journaled at its lower end in a gear case 109, in which the intermediate portion of the shaft 104 is journaled.

Fig. 18 illustrates a construction which is the same as that shown in Figs. 15, 16 and 17, except that the grapple forks 110 are substituted for the scoops 102.

What I claim is:

1. The combination with a derrick frame and a boom mounted thereon for pivotal and endwise movements, of a grapple acting excavating device applied to the end of said boom, connections applied to said derrick frame and to said excavating device for opening, closing, raising and lowering the latter, and means for locking the boom in a lowered position against both pivotal and endwise movements, whereby the grapple acting excavating device, when closed, will be forced into the ground or material to be picked up, substantially as described.

2. The combination with a derrick frame and a boom connected thereto for endwise and pivotal movements, of a grapple acting excavating device applied to the free end of said boom, means applied to said derrick frame and to said grapple acting excavating device for opening, closing, raising and lowering the latter, a rack on said boom, a shaft having a pinion meshing with said rack, means for rotating said pinion-equipped shaft from a distant point, a brake device for locking said shaft against rotation and, hence, said boom against endwise movements, and means for locking said boom in a lowered position against pivotal movements, comprising a windlass drum, a cable connection from said boom and a brake device for locking said drum against rotation, substantially as described.

3. The combination with a derrick frame and a boom connected thereto for endwise and pivotal movements, of a two-part excavating device applied to the free end of said boom, a shaft provided with windlass drum, a cable connecting said drum to the free end of said boom, a toggle connecting said drum equipped shaft to the two members of said excavating device, and a shaft and gear drive connected to the said shaft and guided by a part of said derrick frame, substantially as described.

4. The combination with a derrick and a boom connected thereto for endwise and pivotal movements, of a two-part grapple acting excavating device applied to the free end of said boom, a frame pivotally connected to the free end of said boom, a shaft journaled in the upper portion of said frame and provided with a pair of windlass drums, cables connecting said windlass drums to the free end of said boom, a pair of toggles connecting said drum equipped shaft to the two members of the said grapple acting excavating device, an upright shaft guided by a part of said excavating frame, bevel gears connecting the lower end of said upright shaft to said drum equipped shaft, means for rotating said upright shaft, and means for imparting pivotal and endwise movements to said boom, substantially as described.

In testimony whereof I affix my signature in presence of two witnesses.

WILLIAM WEBSTER.

Witnesses:
H. D. KILGORE,
F. D. MERCHANT.